(12) United States Patent
Jurczyszak et al.

(10) Patent No.: US 10,183,853 B2
(45) Date of Patent: Jan. 22, 2019

(54) FLUID HEATING SYSTEM

(71) Applicant: EEMAX, INC., Waterbury, CT (US)

(72) Inventors: Eric Robert Jurczyszak, Berlin, CT (US); Christopher Mark Hayden, Shelton, CT (US); Sergiu Gabriel Mihu, Newtown, CT (US)

(73) Assignee: EEMAX, INC., Waterbury, CT (US)

(*) Notice: Subject to any disclaimer, the term of this patent is extended or adjusted under 35 U.S.C. 154(b) by 0 days.

(21) Appl. No.: 15/884,061

(22) Filed: Jan. 30, 2018

(65) Prior Publication Data
US 2018/0215602 A1 Aug. 2, 2018

Related U.S. Application Data

(60) Provisional application No. 62/452,023, filed on Jan. 30, 2017.

(51) Int. Cl.
| | |
|---|---|
| *F03B 13/00* | (2006.01) |
| *B67D 1/00* | (2006.01) |
| *B67D 1/08* | (2006.01) |
| *E03C 1/00* | (2006.01) |

(52) U.S. Cl.
CPC ......... *B67D 1/0023* (2013.01); *B67D 1/0082* (2013.01); *B67D 1/0855* (2013.01); *B67D 1/0895* (2013.01); *E03C 1/00* (2013.01); *B67D 2210/00102* (2013.01); *B67D 2210/00141* (2013.01); *F03B 13/00* (2013.01)

(58) Field of Classification Search
CPC .. B67D 1/0023; B67D 1/0082; B67D 1/0855; B67D 1/0895; B67D 2210/00102; B67D 2210/00141; E03C 1/00

USPC ..................................................... 222/146.2
See application file for complete search history.

(56) References Cited

U.S. PATENT DOCUMENTS

| | | | | |
|---|---|---|---|---|
| 2010/0270803 | A1* | 10/2010 | Irwin | F03B 3/02 290/54 |
| 2010/0308591 | A1* | 12/2010 | Godfrey | F03B 13/00 290/54 |
| 2014/0023352 | A1* | 1/2014 | Jurczyszak | H05B 1/0283 392/466 |
| 2015/0192030 | A1* | 7/2015 | Rubinshtein | H02K 7/1823 290/52 |
| 2016/0015178 | A1* | 1/2016 | Alshady | B08B 17/04 264/309 |

(Continued)

*Primary Examiner* — Benjamin R Shaw
(74) *Attorney, Agent, or Firm* — Cahn & Samuels, LLP

(57) ABSTRACT

A fluid heating system including a heating chamber that receives fluid and heats the fluid to provide heated fluid, a dispensing device that dispenses the heated fluid, the dispensing device encompassing the heating chamber, a thermostatic control device that regulates a power supply to the heating chamber, an energy recovery device that harvests mechanical energy provided by a flow of the heated fluid from the heating chamber to the dispensing device and generates electrical energy to power the thermostatic control device, a pressure regulating valve, wherein in a closed position, passage for the heated fluid is prevented between the heating chamber and the drain when a pressure in the heating chamber is below a predetermined pressure threshold and passage for the heated fluid is provided between the heating chamber and the drain when the pressure in the heating chamber is above the predetermined pressure threshold.

17 Claims, 13 Drawing Sheets

(56) References Cited

U.S. PATENT DOCUMENTS

2016/0178234 A1* 6/2016 Hayden ................ F24H 1/0018
  392/486
2016/0305396 A1* 10/2016 Oncale ..................... F03B 3/04
2016/0322886 A1* 11/2016 Brienze, Jr. ........... H02K 7/1823
2018/0038229 A1* 2/2018 Rubinshtein ............ F03B 13/00

* cited by examiner

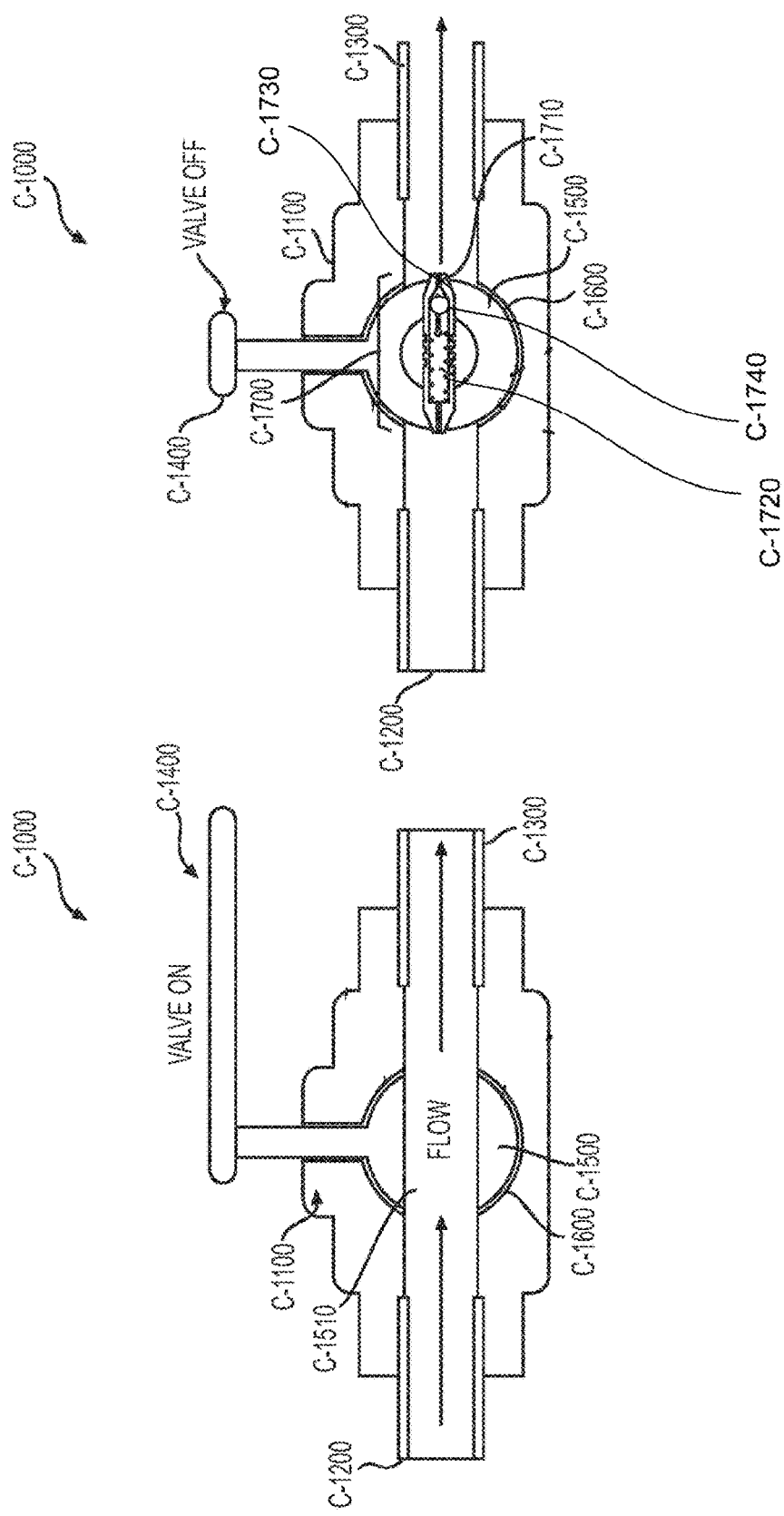

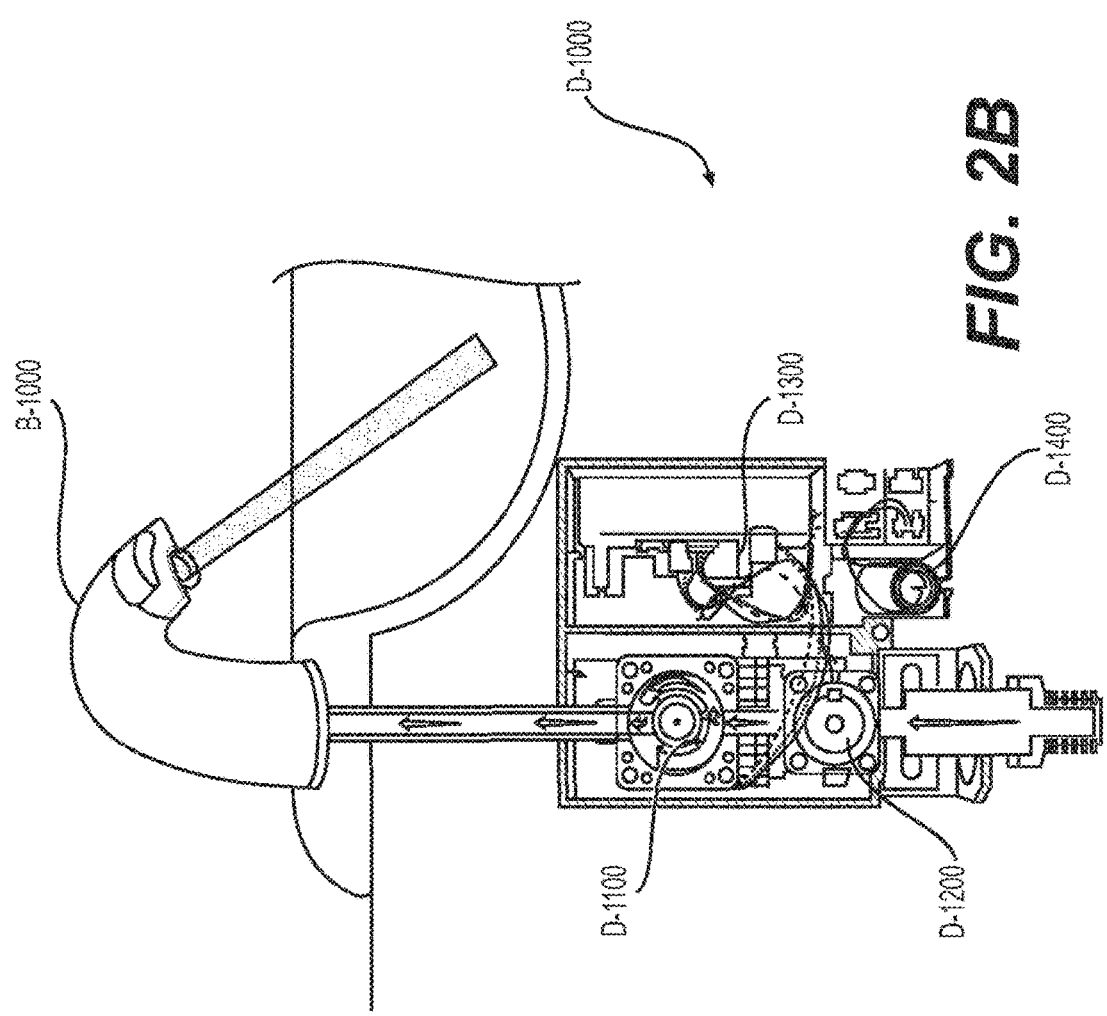

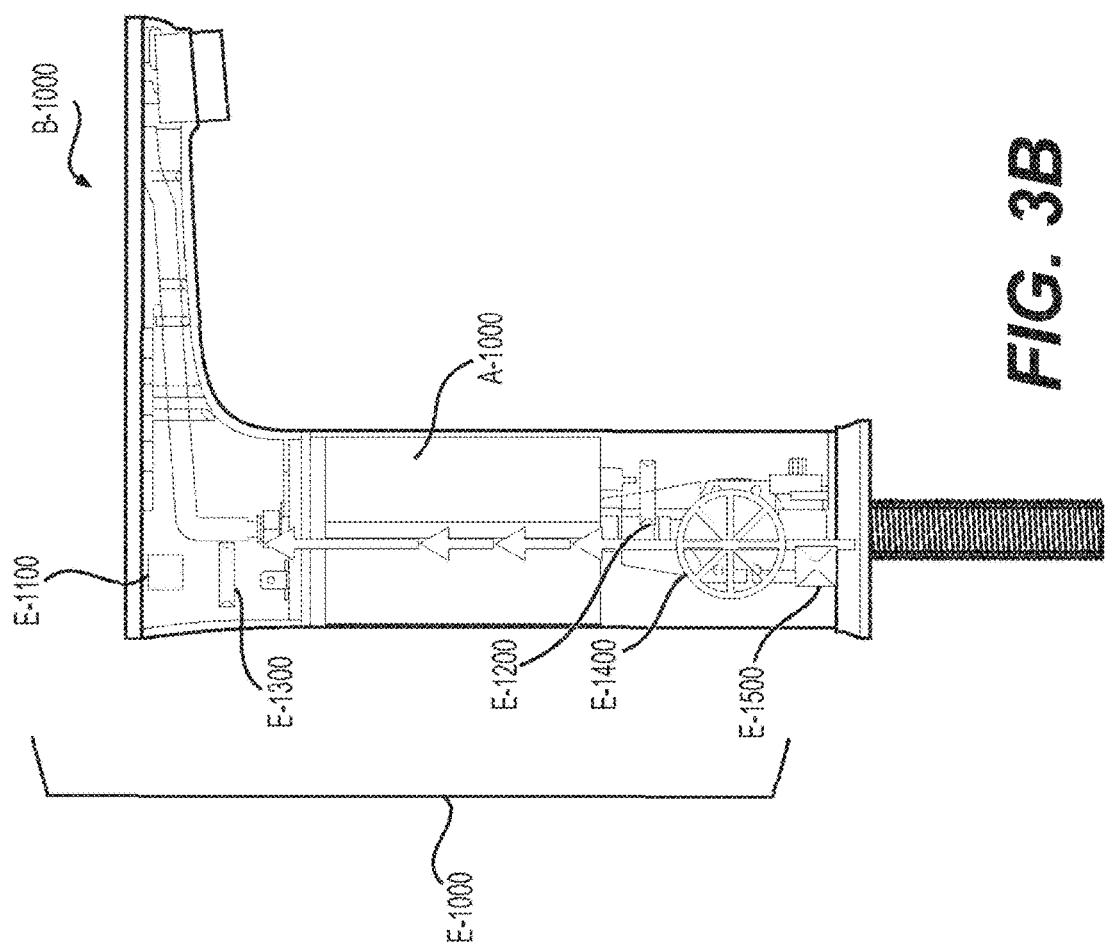

FLUID HEATING SYSTEM

CROSS-REFERENCE TO RELATED APPLICATION

This application claims the benefit of U.S. Provisional Application No. 62/452,023, filed Jan. 30, 2017, the entirety of which is herein incorporated by reference.

BACKGROUND

Providing abundant, rapid, and constantly heated water is essential for commercial and residential applications such as cooking, sterilizing tools or utensils, or preparing hot beverages.

Such a demand in hot water can be addressed by conventional fluid heating systems that heat water as water circulates through them.

Although such conventional fluid heating systems are widely used, they present important drawbacks. For example, such conventional fluid heating systems may fail in precisely heating the water at a desired temperature and heating water in an energy efficient way as these conventional fluid heating systems do not accurately evaluate and provide adequate heat. In addition, these conventional fluid heating systems may be difficult to install and may require important modifications to be added to a preexisting water supply circuit.

SUMMARY

In one example, the present disclosure describes a fluid heating system which overcomes the above-mentioned limitations of precision, energy efficiency, and ease of installation.

In one non-limiting illustrative example, a fluid heating system is presented. The fluid heating system includes a supply line that supplies cold fluid, a heating chamber that receives the cold fluid and heats the cold fluid to provide heated fluid and a dispensing device that dispenses the heated fluid. The fluid heating system further includes a thermostatic control system that regulates a power supply to the heating chamber, and an energy recovery system that harvests mechanical energy provided by a flow of hot fluid from the heating chamber to the dispensing device and generates electrical energy to feed the thermostatic control system.

In one non-limiting illustrative example, a fluid heating system is presented. The fluid heating system includes a supply line that supplies cold fluid, a heating chamber that receives the cold fluid and heats the cold fluid to provide heated fluid, a dispensing device that dispenses the heated fluid, the dispensing device encompassing the heating chamber, a thermostatic control system that regulates a power supply to the heating chamber, an energy recovery system that harvests mechanical energy provided by a flow of the heated fluid from the heating chamber to the dispensing device and generates electrical energy to feed the thermostatic control system, a drain system connected to the heating chamber, the drain system having a drain open to an external environment, and a pressure regulating valve articulable between an opened position and a closed position, wherein in the opened position passage between the drain and the heating chamber is provided, and in the closed position closure between the drain and the heating chamber is provided when a pressure in the heating chamber is below a predetermined pressure threshold and passage between the drain and the heating chamber is provided when the pressure in the heating chamber is above the predetermined pressure threshold.

In one non-limiting illustrative example, a fluid heating system is presented. The fluid heating system includes a heating chamber connectable to a supply line to receive cold fluid and provide heated fluid, an energy recovery system that harvests mechanical energy provided by a flow of the heated fluid from the heating chamber and generates electrical energy, and a thermostatic control system that receives the electrical energy and regulates a power supply to the heating chamber, the thermostatic control system including, a plurality of sensors to provide fluid readings indicative of thermo-hydro-dynamic parameters of the cold fluid and the heated fluid, a power switch to receive actuation signals indicative of a heat demand, an electrical control unit configured to receive the fluid readings, extract values for the thermo-hydro-dynamic parameters, and provide the actuation signals based on the values of the thermo-dynamic parameters.

In one non-limiting illustrative example, a fluid heating system is presented. The fluid heating system includes a supply line that supplies fluid, a heating chamber that receives the fluid and heats the fluid to provide heated fluid, a dispensing device that dispenses the heated fluid, the dispensing device encompassing the heating chamber, a thermostatic control device that regulates a power supply to the heating chamber, an energy recovery device that harvests mechanical energy provided by a flow of the heated fluid from the heating chamber to the dispensing device and generates electrical energy to power the thermostatic control device, a drain open to an external environment, and a pressure regulating valve articulable between an opened position and a closed position, wherein in the opened position, passage for the heated fluid is provided between the drain and the heating chamber, and in the closed position, passage for the heated fluid is prevented between the drain and the heating chamber when a pressure in the heating chamber is below a predetermined pressure threshold and passage for the heated fluid is provided between the drain and the heating chamber when the pressure in the heating chamber is above the predetermined pressure threshold.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1B is a cross sectional view of the pressure regulating valve in an open position, according to certain aspects of the disclosure;

FIG. 1C is a cross sectional view of the pressure regulating valve in a closed position, according to certain aspects of the disclosure;

FIG. 2B is a view of the energy recovery device, according to certain aspects of the disclosure;

FIG. 3B is a cross sectional view of the thermostatic control system, according to certain aspects of the disclosure;

DETAILED DESCRIPTION

Figure 1A:
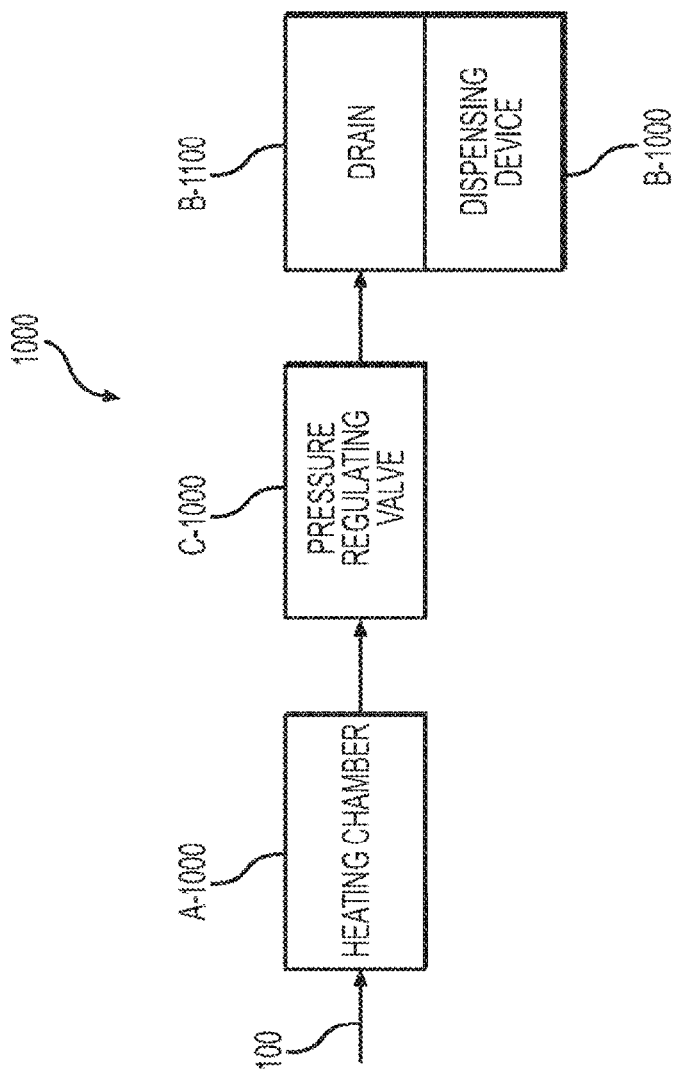
FIG. 1A is a schematic view of a heating system with a pressure regulating valve, according to certain aspects of the disclosure.

All publications, patent applications, patents, and other references mentioned herein are incorporated by reference in their entirety. Further, the materials, methods, and examples discussed herein are illustrative only and are not intended to be limiting.

In the drawings, like reference numerals designate identical or corresponding parts throughout the several views. Further, as used herein, the words "a", "an", and the like include a meaning of "one or more", unless stated otherwise. The drawings are generally drawn not to scale unless specified otherwise or illustrating schematic structures or flowcharts.

FIGS. 1A-1C are a schematic view of a fluid heating system 1000 with a pressure regulating valve C-1000, and cross sectional views of the pressure regulating valve C-1000 in an open position and in a closed position, respectively and according to certain aspects of the disclosure.

The fluid heating system 1000 can include a heating chamber A-1000 that receives fluid, e.g. water, from a supply line 100 and provides heated fluid via a dispensing device B-1000 with a drain B-1100, e.g. a faucet with a sink, that dispenses the heated fluid. The fluid heating system also includes a pressure regulating valve C-1000 that connects an outlet of the heating chamber A-1000 with an inlet of the drain B-1100 to facilitate draining of the heating chamber A-1000.

The pressure regulating valve C-1000 is articulable between an open position and a closed position. In the open position the pressure regulating valve C-1000 provides a passage of the fluid from the heating chamber A-1000 to the drain B-1100 of the dispensing device B-1000. In the closed position, the pressure regulating valve C-1000 blocks the passage of the fluid if the fluid has a pressure below a predetermined pressure threshold and allows the passage of a predetermined amount of fluid if the fluid has a pressure above the predetermined pressure threshold. The predetermined pressure threshold can correspond to a maximum pressure up to which the heating chamber A-1000 can withstand before failures may occur, e.g. cracking, and/or overheating.

The connection between the heating chamber A-1000 and the drain B-1100 via the pressure regulating valve C-1000 prevents pressure accumulations in the heating chamber A-1000 and evacuates the fluid directly through a dedicated and preexisting route, e.g. the drain B-1100, without causing fluid damages, e.g. fluid discharges, staining, mold growing, or the like.

The pressure regulating valve C-1000 can include a valve body C-1100, a valve inlet C-1200 on one side of the valve body C-1100 that receives heated fluid from the heating chamber A-1000, a valve outlet C-1300 on an opposite side of the valve body C-1100 that outputs the heated fluid towards the drain B-1100, a valve handle C-1400 that protrudes from the valve body C-1100, and a ball valve C-1500 inside the valve body C-1100 connected to the valve handle C-1400 and articulable between the open position and the closed position via the valve handle C-1400. In addition, the pressure regulating valve C-1000 can include a seal C-1600 between the ball valve C-1500 and the valve body C-1100 to prevent fluid from leaking into the valve body C-1100 from the ball valve C-1500.

The ball valve C-1500 can also include a ball through hole C-1510 that is aligned with the valve inlet C-1200 and the valve outlet C-1300 when the pressure regulating valve C-1000 is in the open position, and a pressure regulator C-1700 that is aligned with the valve inlet C-1200 and the valve outlet C-1300 when the pressure regulating valve C-1000 is in the closed position.

The pressure regulator C-1700 is elaborated to block the passage of the heated fluid when the pressure of the hot fluid at the valve inlet C-1200 is below the predetermined pressure threshold and to allow the passage of all or a portion of the heated fluid at a particular flow rate when the pressure of the hot fluid at the valve inlet C-1200 is above the predetermined pressure threshold.

For example, the predetermined pressure threshold can be between 0.1 bar to 20.0 bar, preferably between 0.5 bar to 10.0 bar, and more preferably between 1.0 bar and 5.0 bar, which corresponds to pressure in residential heating system.

For example, the pressure regulator C-1700 can include a channel C-1710 aligned with the valve inlet C-1200 and the valve outlet C-1300 when the pressure regulating valve C-1000 is in the closed position, and substantially perpendicular with the valve inlet C-1200 and the valve outlet C-1300 when the pressure regulating valve C-1000 is in the open position.

The channel C-1710 may include a regulator inlet with a seat C-1730, a regulator ball C-1740 to lodge in the seat C-1730, and bias mechanism C-1720, e.g. spring, to push the regulator ball C-1740 against the seat C-1730 and block the passage of the fluid when the pressure of the fluid at the valve inlet C-1200 is below the predetermined pressure threshold and to let the regulator ball C-1740 move away from the seat C-1730 when the pressure of the fluid at the valve inlet C-1200 is above the predetermined pressure threshold and let the fluid pass through the channel C-1710 and the pressure regulating valve C-1000.

The channel C-1710 is configured to prevent damages, e.g. pipe cracking, and bursting, projection of hot fluid and/or steam, from occurring by generating a narrow passage, e.g. passage smaller than a diameter of the ball valve C-1500, between the heating chamber A-1000 and the drain B-1100 when the pressure inside the heating chamber A-1000 is above the predetermined threshold even if the pressure regulating valve C-1000 is in the closed position.

The elements of the pressure regulating valve C-1000, e.g. the valve body C-1100, and/or the ball valve C-1500, can be made of materials configured to resist to a minimum fluid pressure, e.g. pressure superior to the predetermined pressure threshold, as well as to facilitate the articulation of the pressure regulating valve C-1000 between the close position and the open position. For example, the valve body C-1100 can be made of metal, plastic, or metal with a ceramic, for strength, while the ball valve C-1500 can be chrome plated for durability and to provide a smooth contact between the valve body C-1100 and the seal C-1600.

Figure 2A:
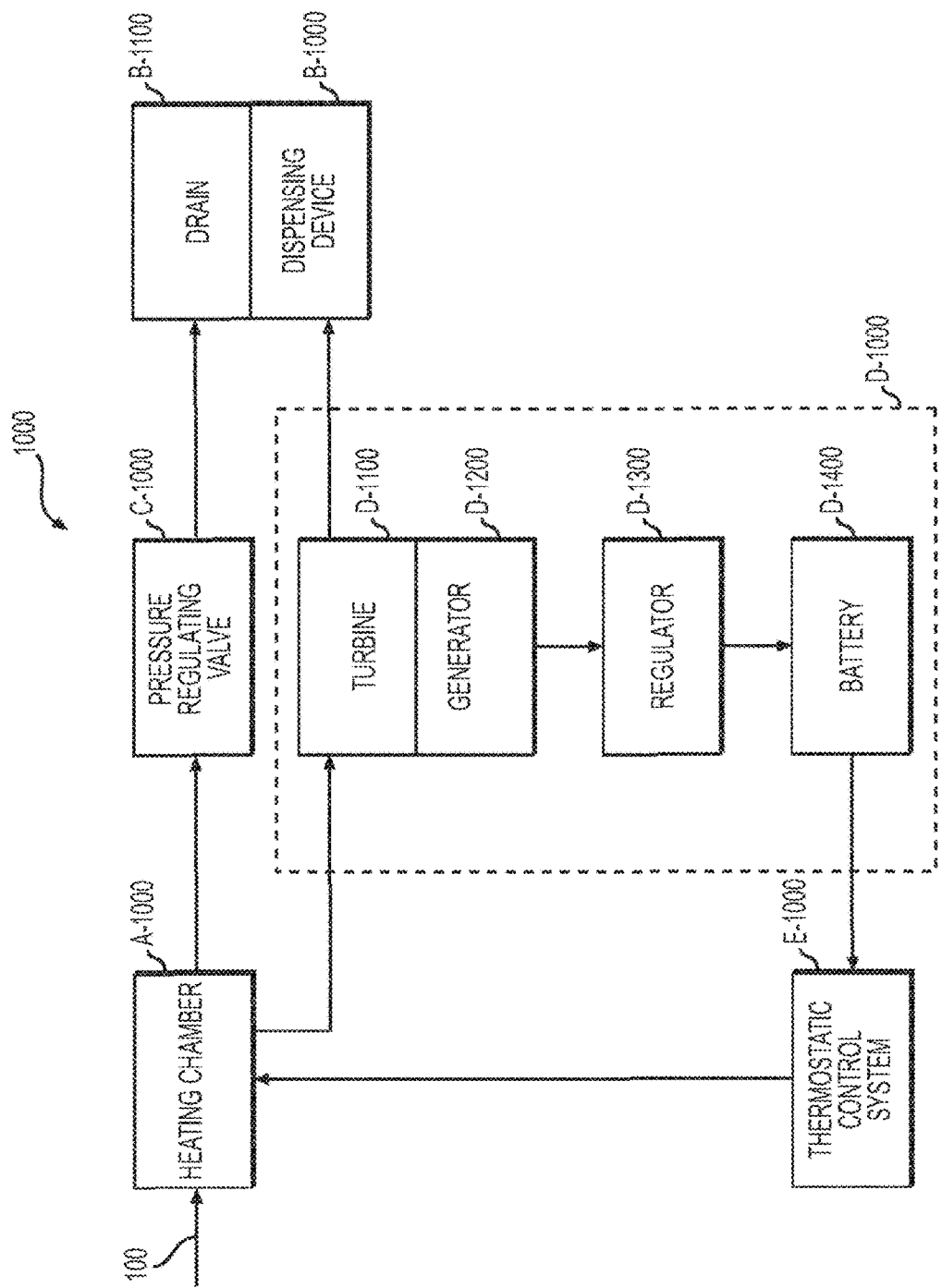
FIG. 2A is a schematic view of the heating system with an energy recovery device, according to certain aspects of the disclosure.

FIGS. 2A-2B are a schematic view of the fluid heating system 1000 with an energy recovery device D-1000 and a cross sectional view of the energy recovery device D-1000, respectively, according to certain aspects of the disclosure.

The fluid heating system 1000 can include an energy recovery device D-1000 to harvest energy provided by the flow of fluid from the heating chamber A-1000 to dispensing device B-1000.

The energy recovery device D-1000 can include a turbine D-1100 driven by a flow of heated fluid when the dispensing device B-1000 dispenses the heated fluid, an electrical generator D-1200 driven by the turbine D-1100 that generates electrical energy, a regulator D-1300 that regulates the electrical energy and provides regulated energy, e.g. constant voltage and/or current, and batteries D-1400 that store the regulated energy and feed a thermostatic control device E-1000 that controls power supplied to the heating chamber A-1000.

In one example, the elements of the energy recovery device D-1000, e.g. the turbine D-1100, the electrical generator D-1200, the regulator D-1300, and/or the batteries D-1400, are configured to be sufficiently small to fit below and/or inside the dispensing device B-1000.

The recovery energy device D-1000 provides the ability to feed power to the thermostatic control device E-1000 without requiring an external power source, e.g. house hold electrical supply, or any electrical equipment necessary to transfer, convert, and/or transform the electrical energy provided by the external source into an electrical energy acceptable for the thermostatic control device E-1000, e.g. line transformers, and/or cables. Such electrical equipment may be voluminous and consume additional energy. Consequently, the energy recovery device D-1000 provides improvements of space and energy for the fluid heating device 1000.

Figure 3A:
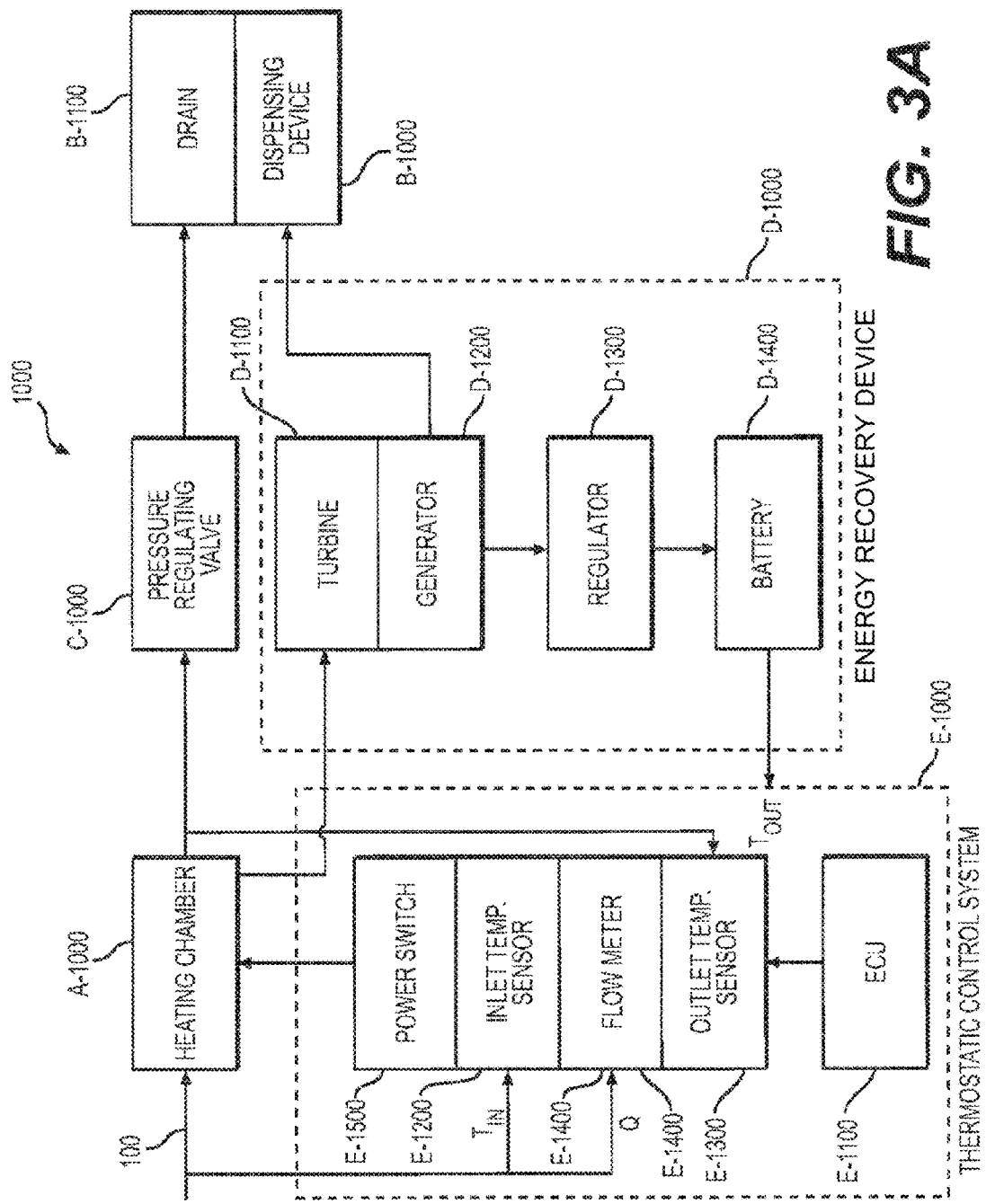
FIG. 3A is a schematic view of the heating system with a thermostatic control system, according to certain aspects of the disclosure.

FIGS. 3A-3B are a schematic and a cross sectional views of the fluid heating system 1000 with the thermostatic control device E-1000 integrated into the fluid dispensing device B-1000, respectively and according to certain aspects of the disclosure.

The fluid heating system 1000 can include a thermostatic control device E-1000 that supplies power to the heating chamber A-1000 as the heated fluid is dispensed via the dispensing device B-1000 and maintains a supply of heated fluid at a preset temperature T.

The thermostatic control device E-1000 can include a plurality of sensors, e.g. temperature sensors, pressures sensors, and/or flow sensors, to provide fluid signals commensurate with thermo-hydro-dynamic parameters, e.g. temperature, pressure, and/or flow rate, of the fluid.

For example, the thermostatic control device E-1000 can include an inlet temperature sensor E-1200 placed upstream of the heating chamber A-1000 to provide readings indicative of an inlet temperature $T_{in}$, a flow meter E-1400 placed upstream of the heating chamber A-1000 that provides readings indicative of a flow rate Q of the cold fluid going through the heating chamber A-1000, an outlet temperature sensor E-1300 placed downstream of the heating chamber A-1000 that provides readings indicative of an outlet temperature $T_{out}$, a power switch E-1500, e.g. a TRIAC, that controls the power supplied to the heating chamber A-1000, and an Electrical Control Unit (ECU) E-1100 that receives the readings provided by the inlet temperature sensor E-1200 and the flow meter E-1400, and controls the power switch E-1500, based on the inlet temperature $T_{in}$ and the flow rate Q, to dispense the heated fluid at the preset temperature T.

The ECU E-1100 may control the power switch E-1500 via Pulse Width Modulation (PWM), Pulse Density Modulation (PDM), Phase Control, Proportional Integral Derivative (PID) techniques, other methods, algorithms, and/or software instructions to manage and supply adequate power to the heating chamber A-1000.

For example, The ECU E-1100 can be configured to actuate the power switch E-1500 to supply power to the heating chamber A-1000 when the flow rate Q is above a predetermined minimum flow rate threshold and to actuate the power switch E-1500 to not supply power to the heating chamber A-1000 when the flow rate Q is below the predetermined minimum flow rate threshold. Further, the ECU E-1100 can actuate the power switch E-1500 to increase the power supplied to the heating chamber A-1000 as the flow rate Q increases and to decrease the power supplied to the heating chamber A-1000 as the flow rate Q decreases.

In addition, the ECU E-1100 can be configured to take into account the outlet temperature $T_{out}$ to manage more accurately the power supplied to the heating chamber A-1000. For example, the ECU E-1100 can actuate the power switch E-1500 to control the power supplied to the heating chamber A-1000 through a feedback loop mechanism, e.g. a PID loop, between the inlet temperature $T_{in}$ and the outlet temperature $T_{out}$.

The thermostatic control device E-1000 precisely and effectively adjusts the power supplied to the heating chamber A-1000 making the fluid heating system 1000 more efficient and capable to dispense hot fluid at a temperature matching the preset temperature T.

Figure 3C:
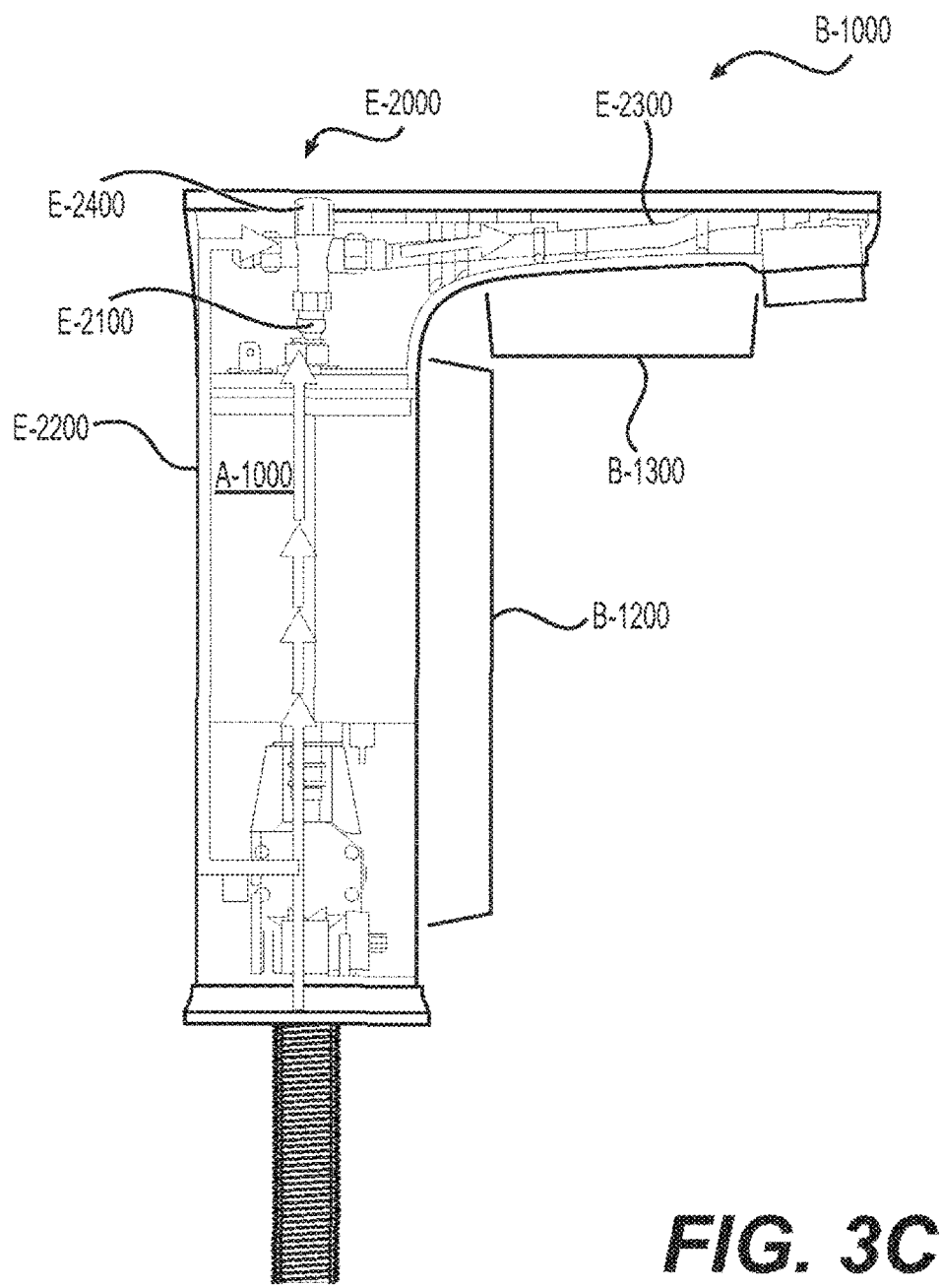
FIG. 3C is a cross sectional view of a mixing valve integrated into a fluid dispensing device, according to certain aspects of the disclosure.
Figure 3D:
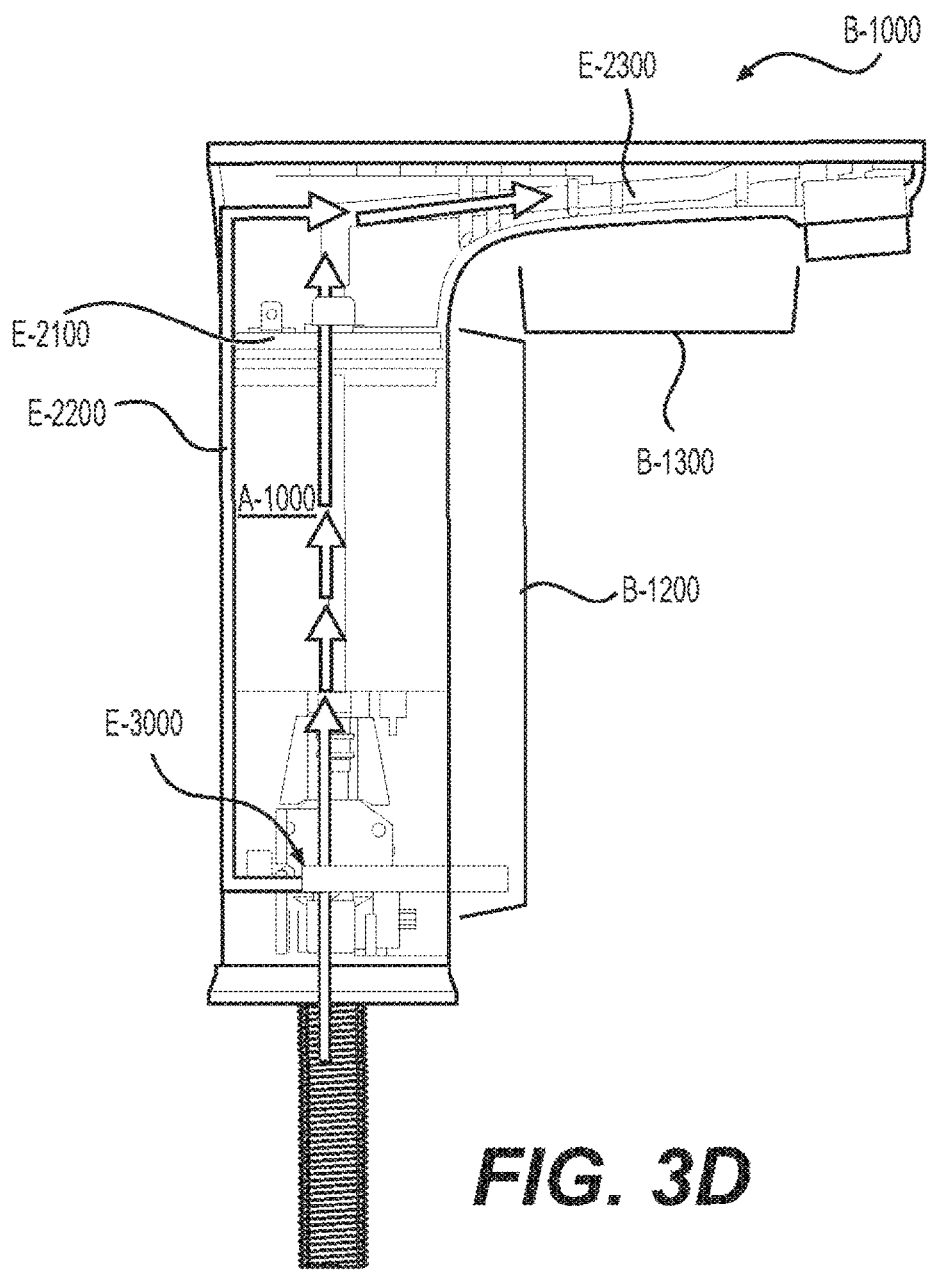
FIG. 3D is a cross sectional view of a manual mixing valve integrated into the fluid dispensing device, according to certain aspects of the disclosure.

FIGS. 3C-3D are cross sectional views of a mixing valve E-2000 and a manual mixing valve E-3000 integrated into the dispensing device B-1000, according to certain aspects of the disclosure.

The fluid heating system 1000 can include a mixing valve E-2000 that controls the temperature of the heated fluid dispensed by the dispensing device B-1000. The mixing valve E-2000 can mix the heated fluid coming out from the heating chamber A-1000 with the cold fluid entering the heating chamber A-1000 and provide a tempered fluid temperature below a predetermined maximum temperature.

The mixing valve E-2000 can prevent the tempered fluid from being dispensed at an excessive temperature, e.g. above the predetermined maximum temperature, which can be desired for public handwashing applications and to meet regulations and/or codes such as the ASSE 1070 code.

The mixing valve E-2000 can include a cold supply line E-2200 that runs between an inlet of the heating chamber A-1000 and a cold inlet of the mixing valve E-2000 to partially diverge the cold fluid entering the heating chamber A-1000 and supplies the mixing valve E-2000 with the cold fluid. The mixing valve E-2000 can also include a hot supply line E-2100 that runs between an outlet of the heating chamber A-1000 and a hot inlet of the mixing valve E-2000 and supplies the mixing valve E-2000 with the hot fluid, and a dispense line E-2300 that runs between an outlet of the mixing valve E-2000 and an outlet of the dispensing device B-1000 and supplies the temperature controlled fluid.

The mixing valve E-2000 can include a knob E-2400 that adjusts a mixing ratio between the hot fluid and the cold fluid and consequently adjust the predetermined maximum temperature of the tempered fluid. The knob E-2400 can be manually controlled or controlled via servo-mechanics based on control feedback and information analyzed by the ECU E-1000.

The fluid heating system 1000 including the mixing valve E-2000 can be completely or partially integrated inside the fluid dispensing device B-1000 to gain space.

For example, the heating chamber A-1000 can be placed inside a body B-1200 of the fluid dispensing device B-1000, the mixing valve E-2000 can be positioned above the heating chamber A-1000 with the hot inlet of the mixing valve E-2000 directly connected to the outlet of the heating chamber A-1000 to minimize a length of the hot supply line E-2100. The cold supply line E-2200 can run along the heating chamber A-1000 and inside the body B-1200 of the fluid dispensing device B-1000 and the dispensing line E-2300 can run inside and along a beak B-1300 of the dispensing device B-1000.

In addition, the knob E-2400 of the mixing valve E-2000 can be placed on top of the mixing valve E-2000 and can face upwardly to be easily accessible by a user when manual adjustment of the mixing ratio is desired.

Alternatively or in addition to the mixing valve E-2000, a manual mixing valve E-3000 can be placed upstream of the inlet of the heating chamber A-1000 to provide additional controls in mixing the hot fluid with the cold fluid and dispensing the temperature controlled fluid, as illustrated in FIG. 3D.

Figure 4:
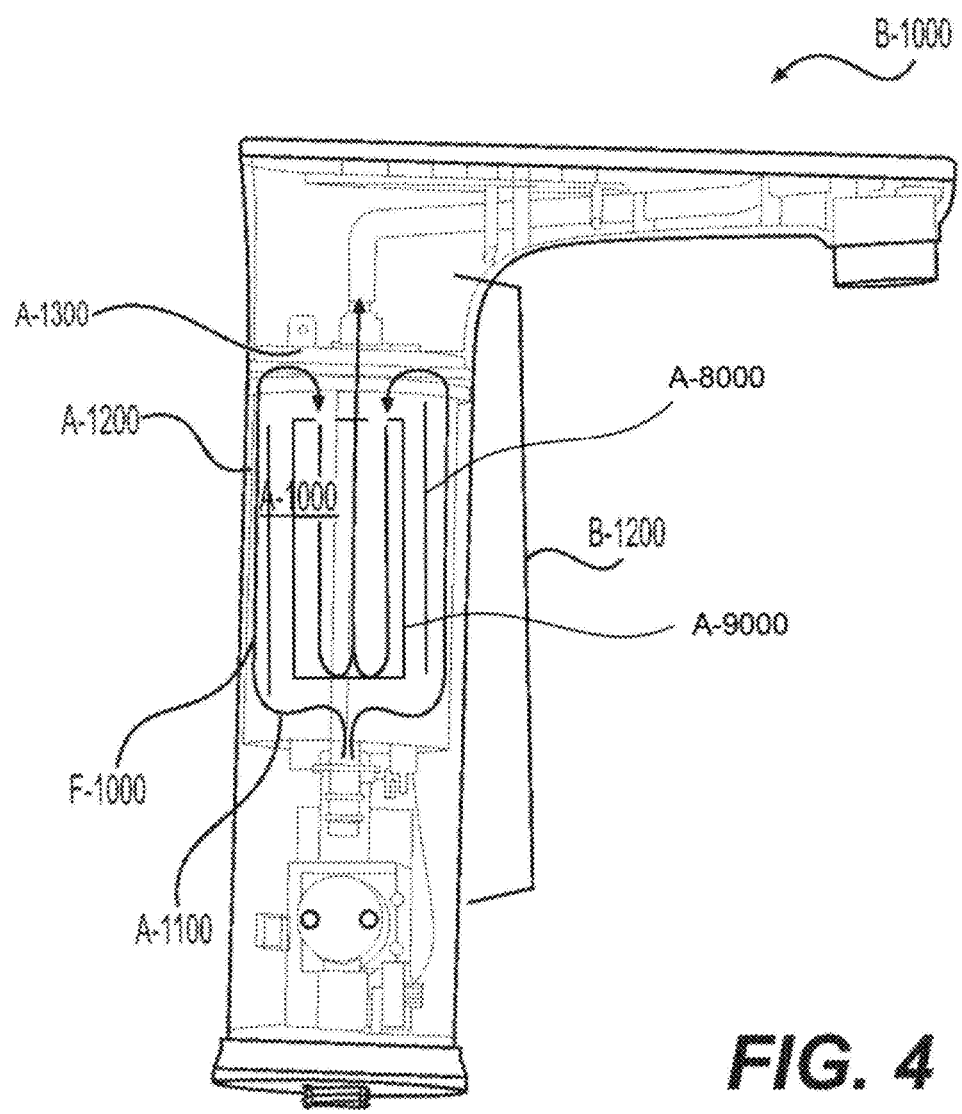
FIG. 4 is a cross sectional view of the heating system with a cold channeling system, according to certain aspects of the disclosure.

FIG. 4 is a cross sectional view of the fluid heating system 1000 with a cold channeling system F-1000, according to certain aspects of the disclosure.

The heating chamber A-1000 can include a cold channeling system F-1000 that insulates the user and/or other outside surfaces from heat generated by the heating chamber A-1000.

The cold channeling system F-1000 can force the cold fluid entering the heating chamber A-1000 to follow a predetermined path before being heated by the heating chamber A-1000 so as to limit heat diffused through the body B-1200 of the dispensing device B-1000. The predetermined path can envelope an internal volume of the heating chamber A-1000 to form a jacket of cold fluid that limits heat diffusion through the heating chamber A-1000 towards the exterior of the dispensing device B-1000.

For example, the predetermined path can be similar to a Hill vortex that goes radially along a lower side A-1100 of the heating chamber A-1000, upwardly along walls A-1200 of the heating chamber A-1000 adjacent to the body B-1200 of the fluid dispensing device B-1000, radially along an upper side A-1300 of the heating chamber A-1000, and downwardly towards the lower side A-1100 of the heating chamber A-1000 to be heated by the heating chamber A-1000.

The cold channeling system F-1000 may rely on channels and/or diffusors A-8000, e.g. winglets, spoilers, and/or geometrical structures configured to deflect the cold fluid, placed on an internal surface of the heating chamber A-1000 that forces the cold fluid to follow the predetermined path and prevent the fluid heating system 1000 from using a separate medium to insulate the heating chamber A-1000. This provides additional advantages of reduced parts, repair and production costs.

In one example, the heating chamber A-1000 can be similar to or include a heating device A-9000 disclosed in the U.S. Pat. No. 9,234,674, which is herein incorporated by reference in its entirety. Alternatively, the heating chamber A-1000 may heat fluid passing therein by other methods as would be understood by one of ordinary skill in the art.

Figure 5A:
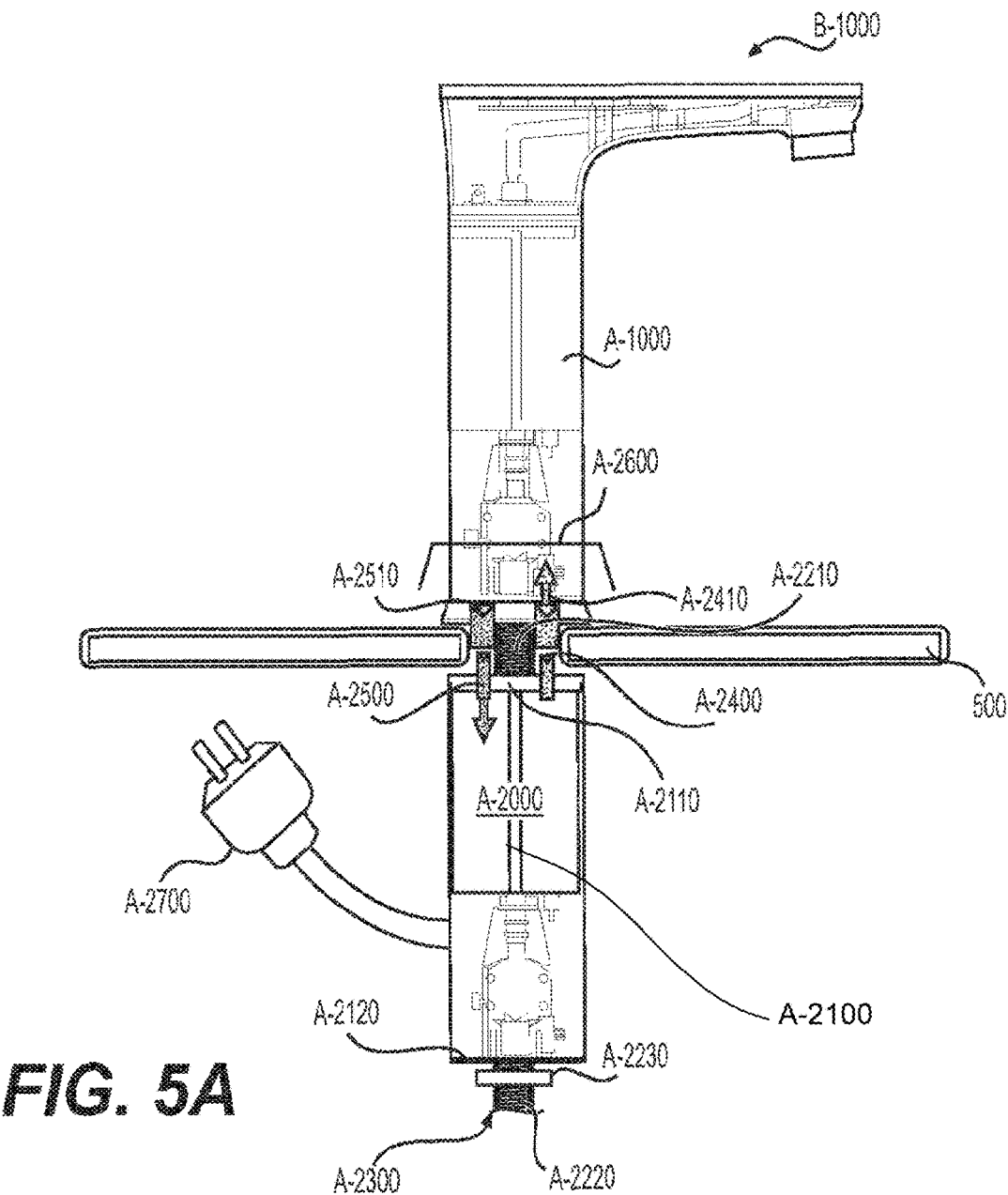
FIG. 5A is a cross sectional view of a supplemental heating chamber connected to the dispensing device, according to certain aspects of the disclosure.
Figure 5C:
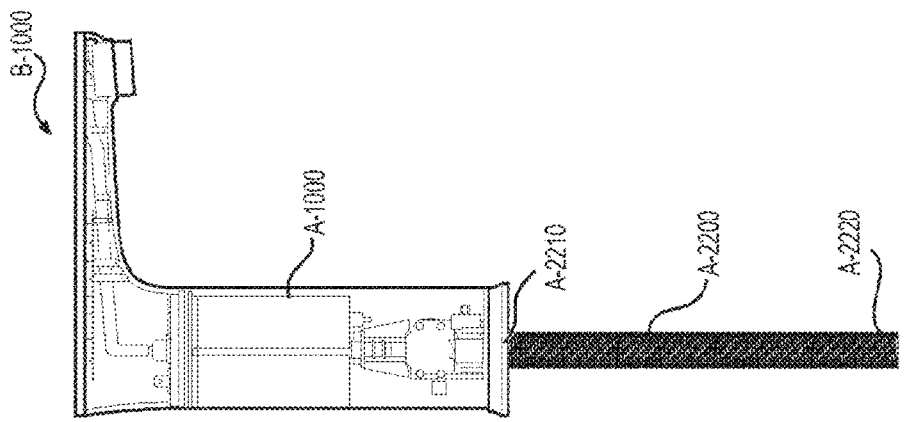
FIG. 5C is a cross sectional view of a stem of the supplemental heating chamber affixed to the dispensing device, according to certain aspects of the disclosure.
Figure 5B:
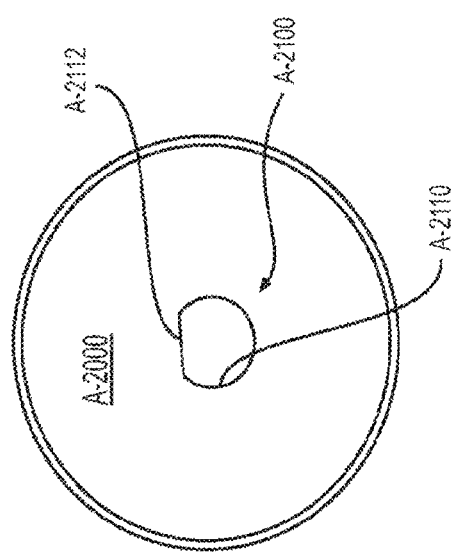
FIG. 5B is a cross sectional view of a passage of the supplemental heating chamber, according to certain aspects of the disclosure.

FIGS. 5A, 5B, 5C are cross sectional views of a supplemental heating chamber A-2000 connected to the fluid dispensing device B-1000, a passage A-2100 of the supplemental heating chamber A-2000, and a stem A-2200 of the supplemental heating chamber A-2000 affixed to the dispensing device B-1000, respectively and according to certain aspects of the disclosure.

The fluid heating system 1000 can include a supplemental heating chamber A-2000 configured to be affixed below a support surface 500 of the dispensing device B-1000, e.g. a counter top or a sink basin, to facilitate an installation of the fluid heating system 1000 by providing ease of access, visibility and by limiting the use of tools.

The supplemental heating chamber A-2000 can include a passage A-2100 that goes through a full length of the supplemental heating chamber A-2000, a stem A-2200, a cold inlet A-2300 that receives the cold fluid, a hot outlet A-2400 that dispenses heated fluid, and a cold outlet A-2500 that dispenses the cold fluid back from the heating chamber A-1000 and/or a supplementary fluid line. The supplemental heating chamber A-2000 can also include a connection system A-2600 that connects the hot outlet A-2400 and the cold outlet A-2500 to a hot inlet A-2410 of the fluid dispensing device B-1000 and a cold inlet A-2510 of the fluid dispensing device B-1000, respectively. Additionally, an electrical supply line A-2700 is provided to feed the supplemental heating chamber A-2000 with electrical energy for heating fluid.

The stem A-2200 can include a stem first end A-2210 that protrudes from an upper side A-2110 of the supplemental heating chamber A-2000 and a stem second end A-2220 that protrudes from a lower side A-2120 of the supplemental heating chamber A-2000, wherein the stem first end A-2210 is affixed to the dispensing device B-1000, e.g. through threading, and a fastening device A-2230, e.g. a jamb nut, is inserted through the stem second end A-2220 to press the supplemental heating chamber A-2000 against the support surface 500, and connect the fluid dispensing device B-1000, via the connection system A-2600.

The connection system A-2600 can easily, e.g. without tool and through a plug-in/out action, connect the hot outlet A-2400 and the cold outlet A-2500 of the supplemental heating chamber A-2000 to a cold inlet and a hot inlet of the dispensing device B-1000, as well as disconnect the hot outlet A-2400 and the cold outlet A-2500 of the supplemental heating chamber A-2000 from the cold inlet and the hot inlet of the dispensing device B-1000.

For example, the connection system A-2600 can rely on quick connect fittings to make-or-break connections between the supplemental heating chamber A-2000 and the dispensing device B-1000. The quick connect fittings can rely on a male tubing and matching female tubing with fastening teeth that lock the male tubing inside the female tubing when a connecting force is applied between the male tubing and the female tubing and wherein the fastening teeth unlock and release the male tubing from the female tubing when an disconnecting force is applied between the male tubing and the female tubing.

The passage A-2100 can have an internal profile passage A-2110 that matches an external profile stem of the stem A-2200, as illustrated in FIG. 5B, to assure alignment between the cold outlet A-2500 of the supplemental heating chamber A-2000 and the cold inlet A-2510 of the dispensing device B-1000 as well as to assure alignment between the hot outlet A-2400 of the supplemental heating chamber A-2000 and the hot inlet A-2410 of the dispensing device B-1000. For example, the internal profile passage A-2110 and the external profile stem can have a partial circular shape with a flat portion A-2112 to prevent rotation of the supplemental heating chamber A-2000 around the stem A-2200, as illustrated in FIG. 5B.

The supplemental heating chamber A-2000 can be used in combination with the heating chamber A-1000, as illustrated in FIG. 5A, to enhance the ability to heat the cold fluid.

Figure 5D:
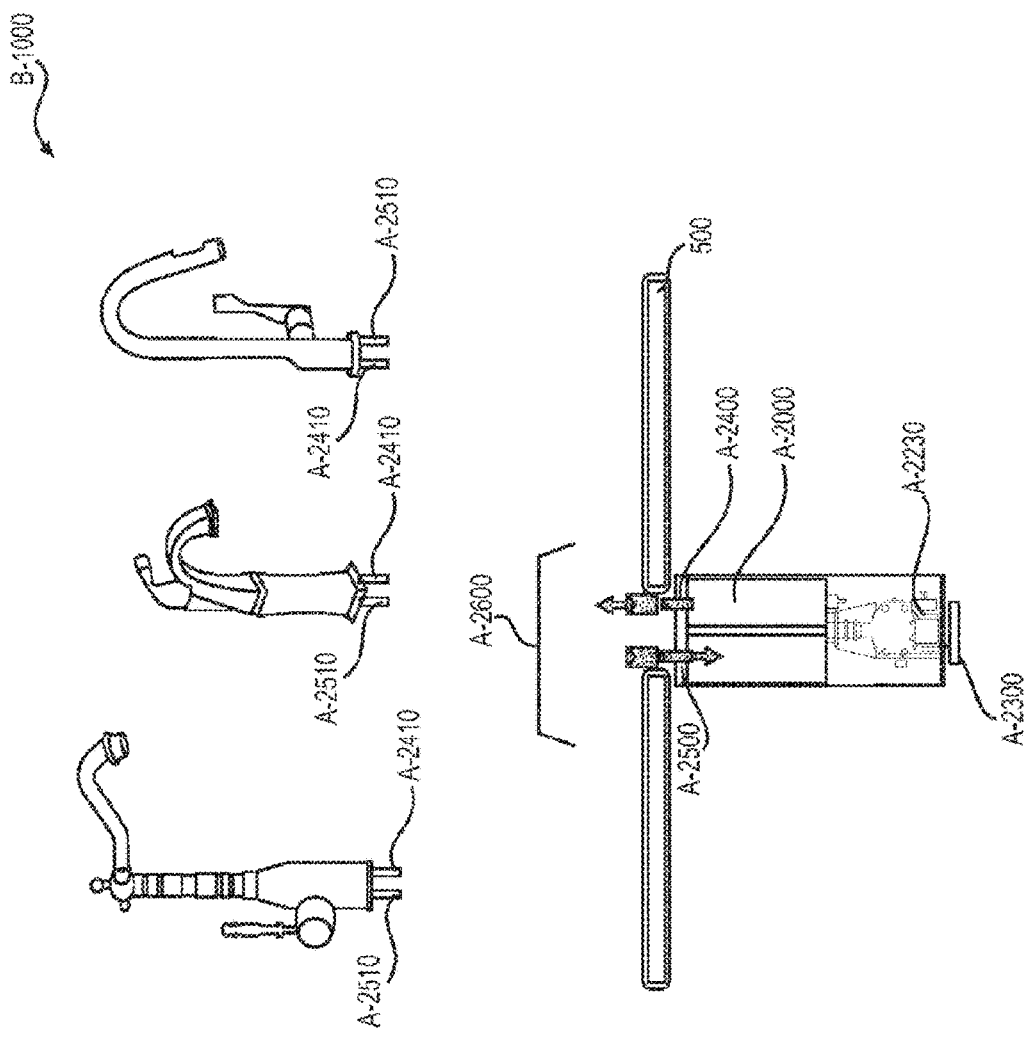
FIG. 5D is a cross sectional view of the supplemental heating chamber affixed to the dispensing device, according to certain aspects of the disclosure.
Figure 5E:
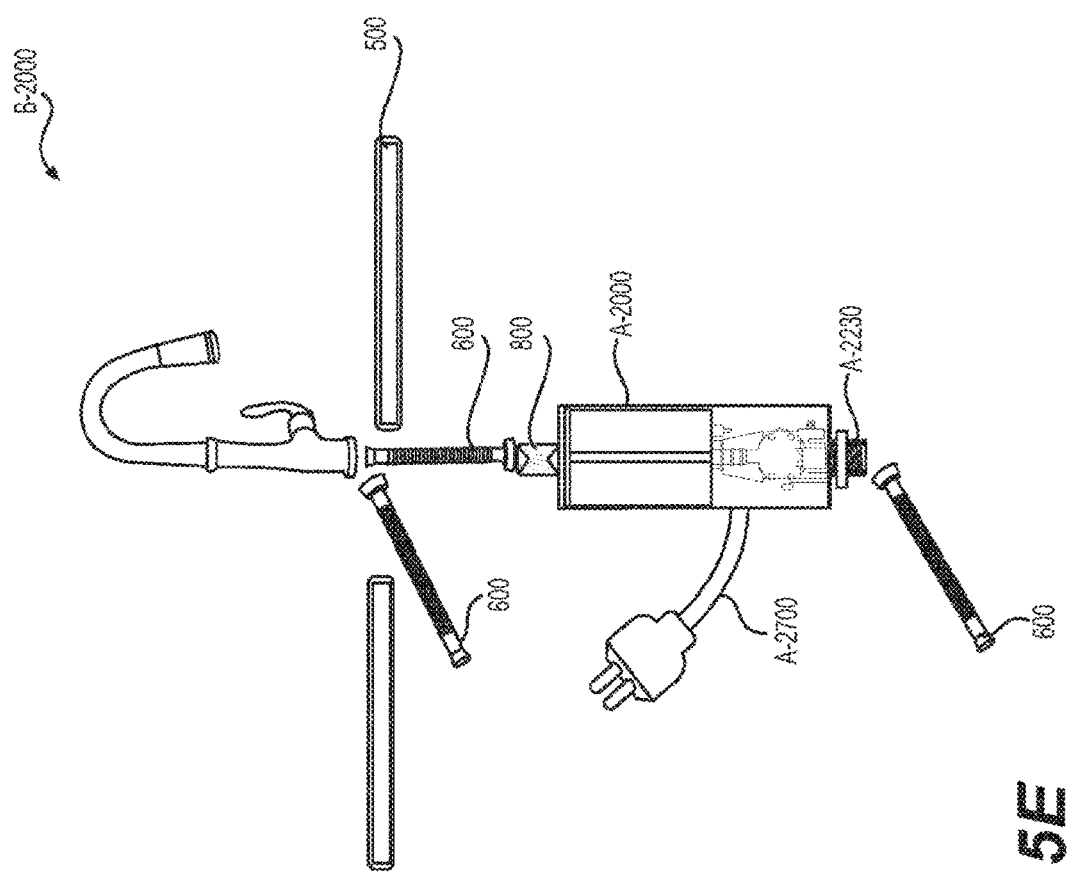
FIG. 5E is a cross sectional view of the supplemental heating chamber mounted onto a standard supply line, according to certain aspects of the disclosure.

FIGS. 5D-5E are sectional views of the supplemental heating chamber A-2000 connected to the dispensing device B-1000, and mounted onto a standard supply line 600, respectively and according to certain aspects of the disclosure.

The supplemental heating chamber A-2000 can be used alone and mounted directly to the dispensing device B-1000 equipped with the hot inlet A-2410 and the cold inlet A-2510 to receive the hot outlet A-2400 and cold outlet A-2500 of the supplemental heating chamber A-2000, as illustrated in FIG. 5D, or be mounted onto a standard supply line 600, such as plastic lines, e.g. PVC, Plymouth, and/or polyethylene, and/or metallic lines, e.g. copper, stainless steel, and/or brass, and be used in combination with any standard dispensing devices B-2000, e.g. commercial off-the-shelf faucet, as illustrated in FIG. 5E.

For example, the supplemental heating chamber A-2000 can include a standard hot outlet 800 elaborated to be used with standard compression hoses, e.g. ⅜", of the standard supply line 600.

The foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modifications and variations on the present disclosure are possible in light of the above teachings. It is therefore to be understood that within the scope of the appended claims, the disclosure may be practiced otherwise than as specifically described herein

The invention claimed is:

1. A fluid heating system comprising:
a supply line that supplies fluid;
a heating chamber that receives the fluid and heats the fluid to provide heated fluid;
a dispensing device that dispenses the heated fluid, the dispensing device encompassing the heating chamber;
a thermostatic control device that regulates a power supply to the heating chamber;
an energy recovery device that harvests mechanical energy provided by a flow of the heated fluid from the heating chamber to the dispensing device and generates electrical energy to power the thermostatic control device;
a drain open to an external environment, and
a pressure regulating valve articulable between an opened position and a closed position, wherein
in the opened position, passage for the heated fluid is provided between the drain and the heating chamber, and
in the closed position, passage for the heated fluid is prevented between the heating chamber and the drain when a pressure in the heating chamber is below a predetermined pressure threshold and passage for the heated fluid is provided between the heating chamber and the drain when the pressure in the heating chamber is above the predetermined pressure threshold.

2. The fluid heating system of claim 1, wherein the pressure regulating valve includes:
a valve body,
a valve inlet on one side of the valve body that receives heated fluid from the heating chamber,
a valve outlet on an opposite side of the valve body that outputs the heated fluid towards the drain, and
a ball valve articulable between the open position and the closed position.

3. The fluid heating system of claim 2, wherein the valve ball includes:
a ball through hole that is aligned with the valve inlet and the valve outlet when the pressure regulating valve is in the opened position, and
a pressure regulator that is aligned with the valve inlet and the valve outlet when the pressure regulating valve is in the closed position.

4. The fluid heating system of claim 3, wherein the pressure regulator includes:
a regulator inlet with a seat,
a regulator ball to lodge in the seat, and
a spring to
push the regulator ball against the seat and prevent the passage of the fluid when the pressure of the fluid at the valve inlet is below the predetermined pressure threshold, and
provide movement of the regulator ball away from the seat when the pressure of the fluid at the valve inlet is above the predetermined pressure threshold.

5. The fluid heating system of claim 1, further comprising:
a supplemental heating chamber connected to the heating chamber via a connection system.

6. The fluid heating system of claim 5, wherein the supplemental heating chamber contains a plurality of channels providing a flow path of cold fluid around an interior surface of the supplemental heating chamber.

7. The fluid heating system of claim 1, further comprising:
a mixing valve positioned between the heating chamber and the dispensing device to control mixing between the heated fluid and the cold fluid.

8. The fluid heating system of claim 7, wherein the mixing valve includes a cold inlet receiving fluid from a channel running along an exterior surface of the heating chamber.

9. The fluid heating system of claim 7, wherein the mixing valve protrudes from the fluid heating system and is configured to be manually operated.

10. The fluid heating system of claim 1, wherein:
the thermostatic control device includes:
a plurality of sensors to provide measurements indicative of thermo-hydro-dynamic parameters of the cold fluid and the heated fluid,
a power switch to receive actuation signals indicative of a heat demand, and
an electrical control unit configured to
receive the measurements, and provide the actuation signals based on the measurements.

11. The fluid heating system of claim 10, wherein the plurality of sensors include a first temperature sensor positioned upstream of the heating chamber to provide signals indicative of an inlet temperature of the cold fluid.

12. The fluid heating system of claim 10, wherein the plurality of sensors include a second temperature sensor positioned downstream of the heating chamber to provide signals indicative of an outlet temperature of the heated fluid.

13. The fluid heating system of claim 10, wherein the plurality of sensors include a flow meter placed upstream of the heating chamber to provide signals indicative of a flow rate of the cold fluid.

14. The fluid heating system of claim 1, further comprising:

a mixing valve that mixes the heated fluid from the heating chamber with the cold fluid entering the heating chamber to provide heated fluid at a temperature below a predetermined maximum temperature.

15. The fluid heating system of claim 14, further comprising:

a cold supply line that runs between the heating chamber and a cold inlet of the mixing valve to partially diverge the cold fluid entering the heating chamber and supply the mixing valve with the cold fluid.

16. The fluid heating system of claim 1, wherein the heating chamber further includes channels positioned on an internal surface of the heating chamber that force the cold fluid to follow a predetermined path to further thermally insulate the fluid heating system.

17. The fluid heating system of claim 16, wherein predetermined path corresponds to a Hill vortex.

* * * * *